United States Patent [19]

Greenwood et al.

[11] Patent Number: 5,643,121
[45] Date of Patent: Jul. 1, 1997

[54] CONTINUOUSLY-VARIABLE-RATIO TRANSMISSIONS

[75] Inventors: Christopher John Greenwood, Lancashire; Thomas George Fellows, Oxford, both of United Kingdom

[73] Assignee: Torotrak (Development) Limited, London, England

[21] Appl. No.: 535,024

[22] PCT Filed: Apr. 14, 1994

[86] PCT No.: PCT/GB94/00782

§ 371 Date: Oct. 11, 1995

§ 102(e) Date: Oct. 11, 1995

[87] PCT Pub. No.: WO94/24462

PCT Pub. Date: Oct. 27, 1994

[30] Foreign Application Priority Data

Apr. 15, 1993 [GB] United Kingdom .................. 9307821

[51] Int. Cl.⁶ .................................................. F16H 37/08
[52] U.S. Cl. .................. 475/72; 475/76; 475/80; 475/207; 475/214
[58] Field of Search .............................. 475/72, 73, 76, 475/80, 207, 214, 215, 219

[56] References Cited

U.S. PATENT DOCUMENTS 5,030,178  7/1991  Ming-Luen ........................ 475/211
5,055,094  10/1991 Cataldo ............................ 475/211
5,207,736  5/1993  Fredriksen ...................... 475/72 X
5,403,241  4/1995  Jarchow et al. ................... 475/72
5,496,223  3/1996  Jarchow ........................... 475/72

FOREIGN PATENT DOCUMENTS 0172701  2/1986  European Pat. Off. .
0177241  4/1986  European Pat. Off. .
0302188  2/1989  European Pat. Off. .
4115623  11/1992 Germany ........................... 475/72
1454702  11/1976 United Kingdom .

*Primary Examiner*—Khoi Q. Ta
*Attorney, Agent, or Firm*—Davis And Bujold

[57] ABSTRACT

A continuous-variable ratio transmission comprising a ratio-varying unit ("variator"), and an epicyclic unit having three outputs arranged concentrically. Two of those outputs are connected respectively in fixed ratio to opposite ends of the variator, so that as the variator ratio changes, the speed of one of these outputs always rises and that of the other falls. These two outputs are also connected by appropriate gearing and clutches to the CVT output shaft. Successive regimes of operation, so extending the overall ratio range of the CVT, are obtained by alternatively connecting each of the two epicyclic outputs to the CVT output. Ratios and other parameters are chosen so that regime changes are synchronous.

8 Claims, 3 Drawing Sheets

| Ratio of 20 | Speed of 7 | Speed of 8 | High Rev. | Mid Rev. | Low | Mid For. | High For. |
|---|---|---|---|---|---|---|---|
| −2.5 | 800 | 5000 | −3000 | −480 | −480 | 2000 | 2000 |
| −0.4 | 2000 | 2000 | −1200 | −1200 | 800 | 800 | 5000 |

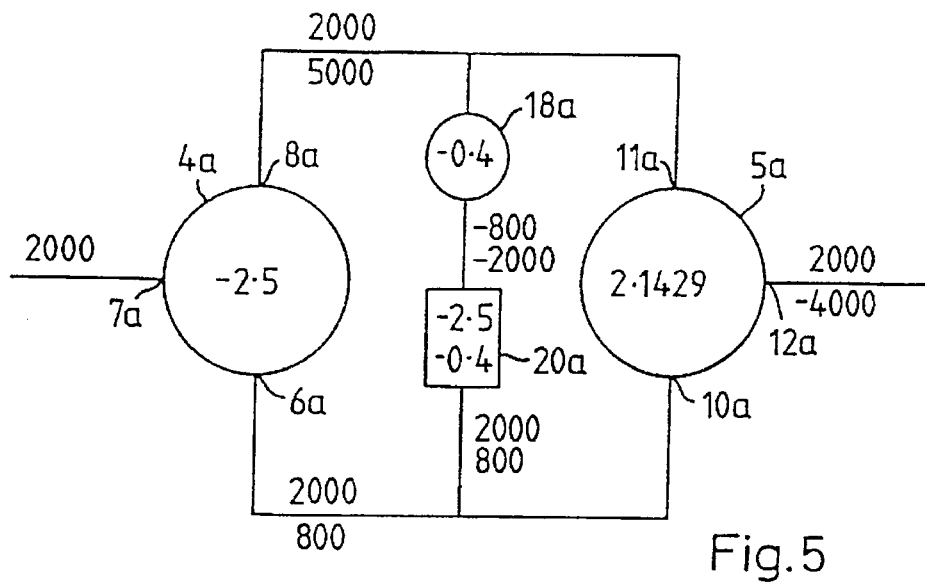
Fig.5
| Ratio of 20a | Speed of 8a | Speed of 6a | High Rev. | Mid Rev. | Low | Mid For. | High For. |
|---|---|---|---|---|---|---|---|
| -2.5 | 2000 | 2000 | 2500 | 400 | 400 | -2000 | -2000 |
| -0.4 | 5000 | 800 | 1000 | 1000 | -800 | -800 | -5000 |
Fig.6
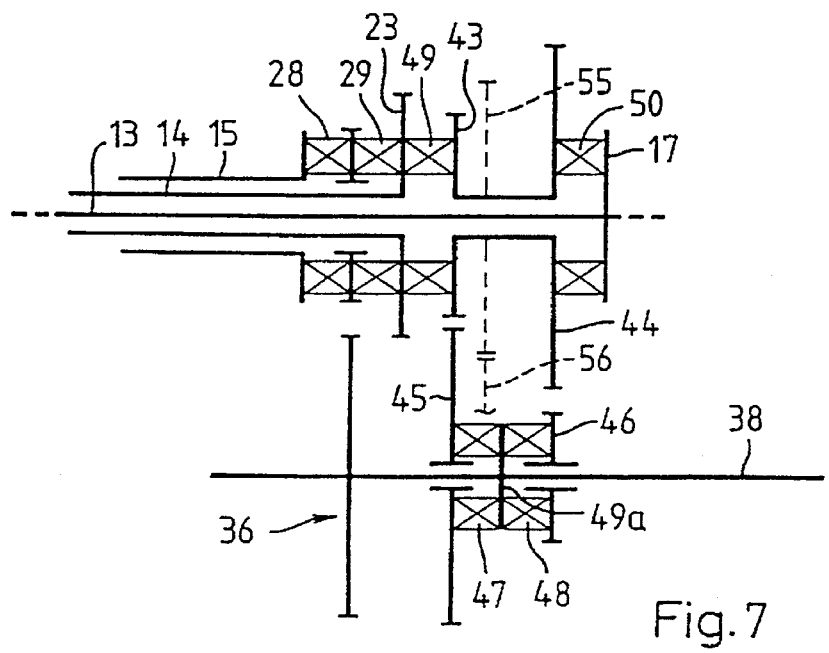
Fig.7

CONTINUOUSLY-VARIABLE-RATIO TRANSMISSIONS

This invention relates to continuously-variable-ratio transmissions ("CVT's") including, as basic components, a ratio-varying member ("variator"), a gearing unit capable of splitting and recirculating power, and a plurality of clutches alternatively engageable to connect the combined output of the variator and unit by way of further gearing to a final output shaft of the CVT as a whole. In any single typical "regime" of the CVT, that is to say when a particular one of the clutches is engaged, the ratio range of the CVT is a function of that of the variator. Providing more than one alternative clutch/further gearing combination to transmit the drive to the CVT output creates a "multi-regime" system in which the full variator range may be utilised in each of the regimes, so that the ratio range of the CVT as a whole is extended, and can approximate to the ratio range of the CVT, raised to the power of the number of regimes. While the invention includes transmissions with variators that are capable of delivering zero output speed in response to finite input speed, the invention particularly applies to CVT's whose variators are of belt-and-sheave or other type that are not capable of delivering zero output speed. More particularly still, the invention applies to CVT's with variators of the toroidal-race, rolling-traction type.

The invention arises particularly from a consideration of the needs of a vehicle such as a front-loading dumper truck. A CVT for such a vehicle requires not only a wide total range, typically giving the vehicle a maximum reverse speed with a value that amounts to a substantial fraction—say 60%—of the maximum forward speed. Two further desiderata are, firstly, the CVT should be capable of delivering high torque when the vehicle is moving at low speeds, both forwards and in reverse, when the vehicle will typically be advancing a bucket into a mass of earth, sand, stones or the like, filling it and then reversing to withdraw it. Secondly, where the transmission is a multi-regime CVT it is particularly advantageous that the range of one of the several regimes should include both forwards and reverse motion, with a "geared neutral" condition between them, to ease the driver's task in changing frequently between forward and reverse motion when manoeuvring the vehicle at low speed, and to avoid the need for forward and reverse clutches which would otherwise need to be changed-over frequently in that driving condition when the CVT is required to deliver particularly high torque.

It should also be noted that the CVT of the present invention is to be distinguished particularly from the CVT's described in prior Patent Publication EP-A-0302188, which describes CVT's in which the capacity to operate in a succession of regimes, and so provide an extended overall ratio range, derives from connecting the CVT output alternatively to one of two shafts whose speeds increase and decrease reciprocally. In EP-A-0302188, however the gearing units comprise two epicyclic gears so arranged that both of them both split and recirculate power in all regimes. Later gears must therefore be designed to withstand continuous and prolonged usage. The gearing units of the present invention again contain two such gears, but arranged so that only one of them ever recirculates power, and does so in one regime only.

The invention is defined by the claims, the contents of which are to be considered as included within the disclosure of this specification. The invention includes CVT's as described with reference to the accompany drawings, will now be described by way of example with reference to those drawings in which:

FIG. 3 is a table of speed and ratio values;

FIGS. 4–6 are similar to FIGS. 1–3 but relate to an alternative CVT, and

FIG. 7 shows a modification of FIG. 1 in outline indicating how further regimes could be added.

In these figures a minus (−) sign, when applied to an epicyclic gear ratio, indicates that a reversal of direction would occur between the annulus and sun members if the carrier were held stationary. When applied to a speed of rotation it indicates that the rotation is in the opposite sense to that of the prime mover. When applied to a gear train it indicates a reversal of direction between the input and output gears. It will thus be apparent that in FIGS. 1 and 4, for the sake of simplicity, some idler gears have been omitted in certain gearing trains where the number of gears actually shown would obviously result in an output of different sign from the one given.

Figure 1:
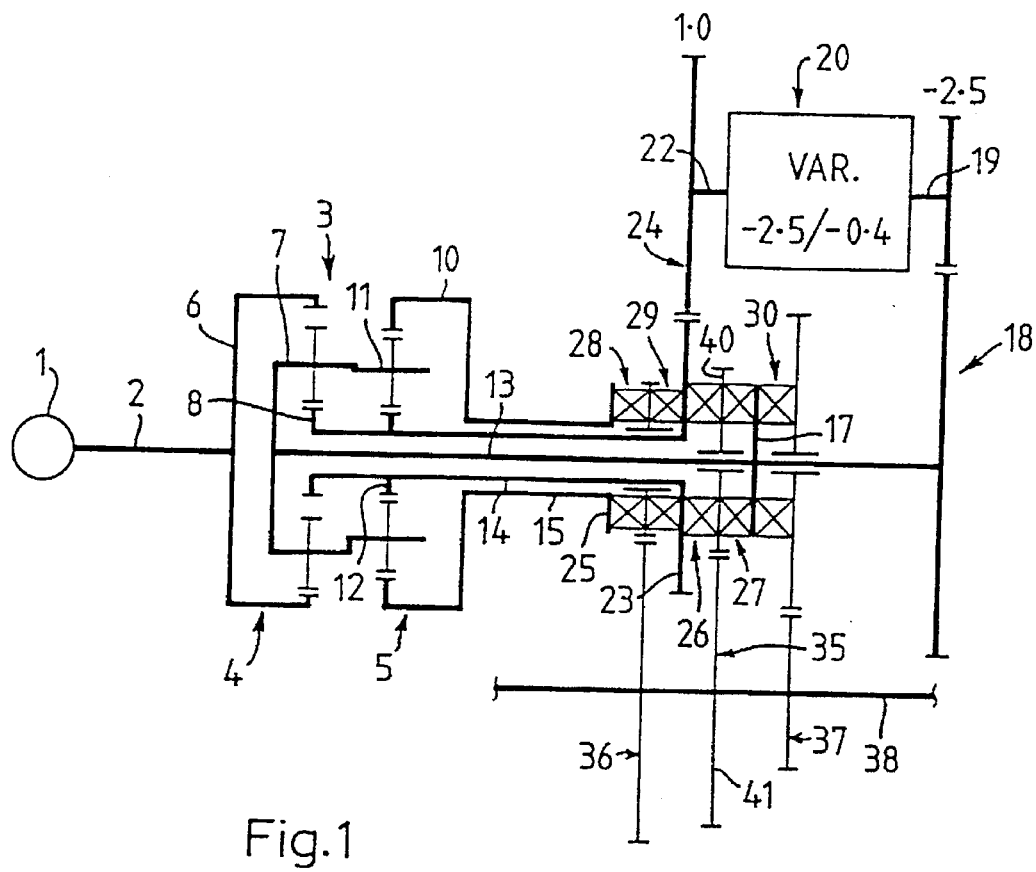
FIG. 1 is a diagrammatic view of one CVT, taken in a common plane including the axes of the variator, the epicyclic unit and the final drive shaft.
Figure 2:
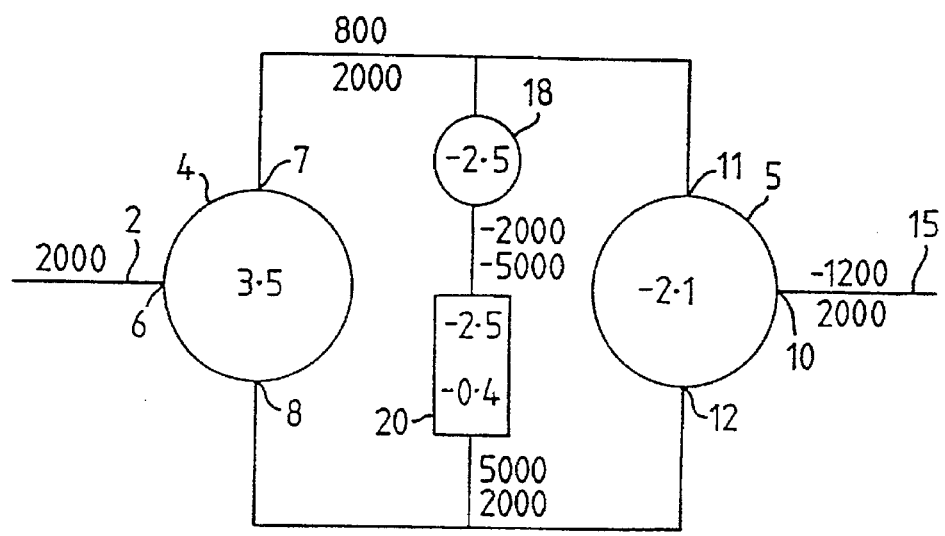
FIG. 2 is a schematic view of parts of the CVT of FIG. 1, including further ratio and speed values.

FIGS. 1 and 2 show a CVT in which a prime mover 1 drives the input shaft 2 to an epicyclic unit 3 at an illustrative constant speed of 2000 rpm. Unit 3 comprises first (power-splitting) and second (power-recirculating) epicyclic gears 4 and 5. Shaft 2 drives the annulus 6 of gear 4, which also comprises a carrier 7 (on which double planets are mounted) and a sun gear 8 and has an overall epicyclic ratio (FIG. 2) of 3.5. Gear 5 consists of annulus 10, carrier (single planets) 11 and sun 12, and has an overall ratio of −2.1. In this embodiment of the invention the carriers 7, 11 and suns 8, 12 of the two gears are mounted in common. The output shaft 13 of the common carriers, and the tubular output members 14, 15 of the common suns and of annulus 10 respectively, are all coaxial with input shaft 2. Shaft 13 carries a clutch-engaging flange 17 and also, by way of a step-up gear set 18 of ratio −2.5, drives one side 19 (which will be referred to as the input member) of a variator 20 of the toroidal-race rolling-traction type. The variator has an overall ratio range −2.5/−0.4, indicating (as shown in FIG. 2) that when input member 19 is rotating at a minimum of 2000 rpm in one sense the other side of the variator, that is to say the output member 22, will be rotating at 5000 rpm in the other sense, and vice versa. Tubular output shaft 14 from the common suns of unit 3 carries a clutch-engaging flange 23 which is connected to variator output member 22 by a non-reversing gear train 24 of unity ratio. Because shafts 13 and 14 are connected to opposite sides of variator 20, their speeds of rotation increase and decrease reciprocally as the variator ratio changes. The output tube 15 of annulus 10 carries a clutch-engaging flange 25.

The concentricity of the outputs 13–15 of epicyclic unit 3 facilitates one significant feature of the present invention, namely that five successive regimes of operation of the CVT are obtainable by the successive engagement, one at a time, of five clutches 26–30, the five clutches being mounted in a compact sequence coaxial with the three output shafts 13–15. Another significant feature of the invention is that only three downstream gear trains 35–37 are engageable by one or other of the clutches to connect to the final drive shaft 38. In FIG. 1 gear train 35 comprises a first gear 40 rotatable about shaft 13 and a second gear 41 fixed to shaft 38. Gear train 35 is a reduction gear with reversal of rotation and of ratio −0.6, train 36 is a reduction gear train of ratio 0.4 without reversal of rotation, and train 37 is a step-up train of ratio 2.5 and also with no reversal of rotation.

Figures 3, 4:
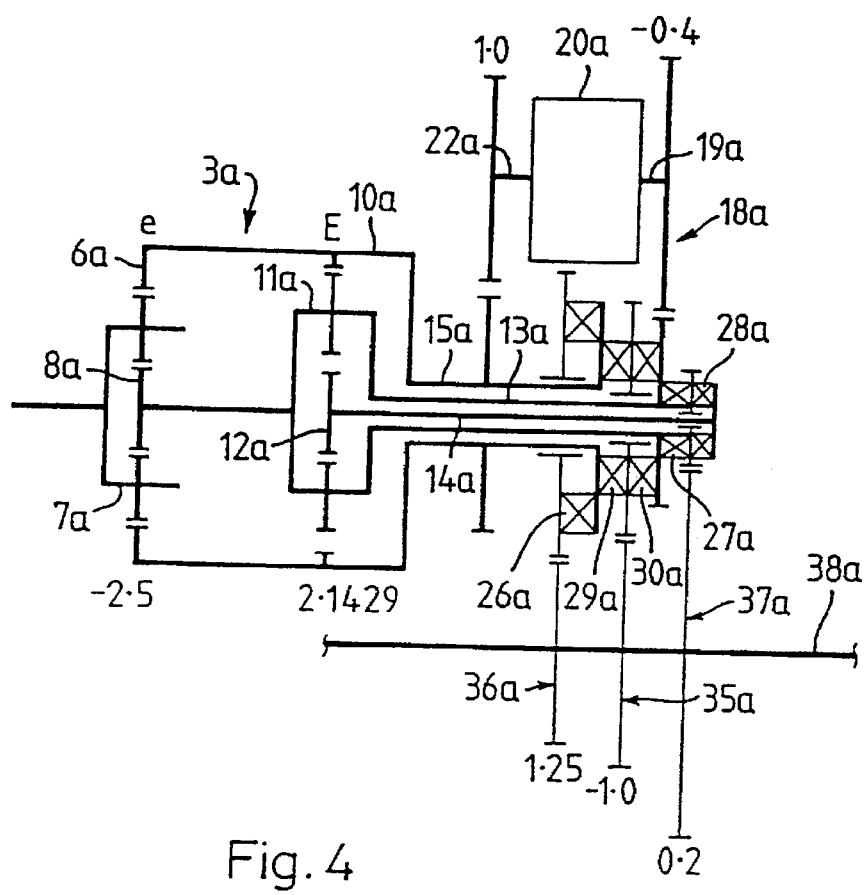

A further feature of the invention is that by careful choice of speeds and ratios, as shown in FIGS. 1 and 3, the CVT achieves an overall range of rotary speed of final drive 38 (from −3000 to +5000 rpm, in response to a constant 2000 rpm rotation of shaft 2 in FIG. 1), but also synchronous changes between regimes, that is to say changes in which the simultaneous disengagement of one of clutches 26–30 and the engagement of another involves no instantaneous change to the speed of rotation of any component of the CVT, or indeed of the prime mover 1 also.

Yet a further feature of the invention, which contributes particularly to the economy in the total number of components and especially in the need for only the three gear trains 35–37, is that the epicyclic unit 3 and variator 20 are matched so that at one particular, given variator ratio the entire unit 3 rotates as one, so that items 2 and 13–15 all have the same rotary speed. Conveniently, and In the examples shown in FIGS. 1 and 4, that given ratio lies at one extreme end of the variator's ratio range. In FIG. 2 the given variator ratio is −0.4. Because all the components of unit 3 rotate together at this given ratio, it is possible to change regimes synchronously by the simultaneous disengagement/engagement of two clutches which co-operate with different outputs of unit 3, but with a common gear train to connect them to final drive 38. In the embodiments of both FIGS. 1 and 4, this characteristic is used to achieve the result that in the succession of five regime changes needed to take the CVT from one end of its overall ratio range to the other, alternate changes take place at the given variator ratio and involve no change of downstream gearing (35–37), while the remaining regime changes all take place at the opposite end of the variator range and do require a change of the downstream gearing.

A sequence of operation of the CVT from one end of its overall range will now be described, beginning in the highest reverse regime, in which clutch 26 is engaged, connecting the sun (8) output of power-splitting gear a to output gear train 35. The suns 8, 12 of epicyclic gears 4, 5 are of course connected but for the purposes of the sequence of synchronous changes, now about to be described, the power-splitting gear 4 is of more significance because it is only in one regime ("low") that the second, power-recirculating epicyclic gear 5 transmits power. With variator 20 at the −2.5 end of its ratio range, the 3.5 ratio of gear 4 and the constant 2000 rpm input speed of annular 6 dictate speeds of 800 and 5000 rpm for carrier 7 and sun 8 respectively, as indicated by FIGS. 2 and 3. The −0.6 ratio of gear train 35 therefore drives item 38 at −3000 rpm. Sweeping variator 20 to the other, −0.4 end of its ratio range causes carrier 7 and sun 8, and thus all components of unit 3, to rotate at 2000 rpm. A synchronous disengagement/engagement of clutches 26/27 can therefore be made, so that drive is still transmitted to shaft 38 by way of gear train 35, but now from the flange 17 connected to the carrier 7 instead of flange 23 connected to the sun 8. The speed of shaft 38, as the regimes change, will be 2000×−0.6=−1200 rpm.

The CVT will now be in "middle reverse" regime and once variator 20 has swept back during that regime to the original −2.5 end of its range, the speeds of components 6, 7 and 8 of gear 4 will again be 2000, 800 and 5000 rpm. respectively, so that shaft 38 will be rotating at −480 rpm. If now clutch 27 is disengaged and clutch 28 engaged, so connecting shaft 38 to the annulus output 15 by way of gear train 36, the product of annulus speed −1200 rpm (dictated by the −2.1 ratio of gear 5) and the 0.4 ratio of train 36 results in the same speed of −480 rpm for shaft 38: a synchronous change is therefore made.

The CVT is now in the so-called "low" regime, in which sweeping of the variator back to the −0.4 end of its range causes the speed of final drive shaft 38 to fall from a negative value (−480) through zero (the condition known in the art as "geared neutral"), and then to rise in the forward direction. When the −0.4 variator ratio is reached, all components of unit 3 rotate once more at 2000 rpm, so that clutch 28 can be disengaged and clutch 29 engaged synchronously, connecting shaft 38 to sun 8 again without changing the downstream gear train 36.

The CVT may now be said to be in "middle forward" regime, in which variator 20 sweeps back to the −2.5 range end. At that point the speeds of components 6, 7 and 8 of gear 4 are once again 2000, 800 and 5000 rpm, so that shaft 38 will be rotating at 5000×0.4=2000 rpm.

To change to the fifth and final, or "high forward" regime clutch 29 is disengaged and clutch 30 engaged, changing the connection of shaft 38 from the sun 8 to carrier 7 and also substituting step-up gear train 37 (ratio 2.5) for step-down train 36. The instantaneous rotary speed of shaft 38 once the change has been made will be 800×2.5=2000, so that the change will therefore be synchronous once again. In this regime, as the variator sweeps back once again to the −0.4 end of its range, the speed of the linked carriers 7, 11 rises from 800 to 2000 rpm, resulting in a maximum 5000 rpm forward speed for shaft 38.

In the alternative embodiment of the invention shown in FIGS. 4 to 6 of the drawings, components with a similar function to those shown in FIGS. 1 and 2 are indicated by the same reference number, but followed by the letter a. The principal difference between the two alternatives is that in the embodiment of FIGS. 4 to 6 it is at the opposite (−2.5) end of the range of variator 20 that all components of gear unit 3a rotate as one, so that a synchronous change can be made between regimes without changing whichever of the downstream gear ratios (35a–37a) is in place. At the other (−0.4) end of the variator range a regime change, although again of course synchronous, can only be made by including a change of the downstream gear ratio. As FIGS. 5 and 6 show best, this embodiment requires different ratios of −2.5 and 2.1429 for gears 4a and 5a respectively, and as will be seen from FIG. 4 the annuli 6a and 10a are now connected, carrier 7a of gear 4a carries single planets while carrier 11a of gear 5a carries double planets, and sun 8a of gear 4a is now connected to carrier 11a and the "free" component of the second gear 5a is now the sun 12a. As FIG. 6 shows best, this embodiment of the CVT yields a slightly shorter total range of the speed of final drive shaft 38a from 2500 rpm in reverse to −5000 rpm in forwards, the reversal of signs being of course a consequence of the reversed direction of the final drive shaft 38. The order in axial sequence of the five clutches 26a–30a is different also, as are the ratios of the three gear trains 35a–37a by which the clutches are connected to the final drive shaft 38a.

In this embodiment, maximum reverse speed of shaft 38a occurs with variator 20a at extreme ratio −2.5, with clutch 26a engaged and connecting shaft 38a to the annulus output shaft 15a (rotating, like all components of gear unit 3a, at 2000 rpm) by way of gear train 36a, of ratio 1.25, so that item 38a rotates at 2500 rpm. When the variator reaches the opposite (−0.4) end of its range, shaft 38a will be rotating In reverse at 1000 rpm, and a synchronous change is made by opening clutch 26a and engaging clutch 27a to connect the carrier output shaft 13a, now rotating at 5000 rpm, by way of gear train 37a of ratio 0.2. The CVT is now in "middle reverse" regime. When the variator returns to its −0.4 ratio, shaft 38a will be rotating at 400 rpm and "low regime" may be engaged by opening clutch 27a and closing clutch 28a to the sun output 14a, the change being synchronous because shafts 13a, 14a are rotating at the same speed. During low regime "geared neutral" is achieved as before, and when variator 20a reaches the −0.4 end of its range once again, shaft 14a will be rotating at −4000 rpm (see FIG. 5) so that shaft 38a is rotating at −800 rpm. Change to "middle forward" regime is then made by opening clutch 28a and closing clutch 29a, connecting the annulus output 15a (now rotating at 800 rpm) to shaft 38a by way of gear train 35a (of ratio −1.0), so that the change is synchronous. The CVT is now in "middle forward" regime, and when the variator 20a has swept yet again to the −2.5 ratio shafts 13a–15a will all be rotating at 2000 rpm so that final drive shaft 38a will be rotating at −2000 rpm. Synchronous change to the fifth and final "high forward" regime will then be made by opening clutch 29a and closing clutch 30a, connecting gear train 35a instead to the carrier output shaft 13a, which in the course of high forward regime rises in speed from 2000 to 5000 rpm, so that shaft 38a rises to a top forward speed of −5000 rpm.

Further regimes could be added, if desired, in a variety of ways, one of which is shown in FIG. 7 where the first gear 40 of gear train 35 of FIG. 1 is replaced by a pair of gears 43, 44, of different ratio but connected to each other and both rotatable about shaft 13. The second gear 41 of train 35 is replaced by separate gears 45 and 46, both rotatable about shaft 35 but engageable, by way of clutches 47 and 48 respectively, with a flange 49a carried by shaft 38. Gears 43 and 45 engage, as do gears 44 and 46. Gear 43 and flange 23 are engageable by way of a clutch 49 and gear 44 and flange 17 are engageable by way of a clutch 50. By suitable choice of ratios for the new gear trains 43, 45 and 44, 46, such a modification adds a sixth regime to the CVT, with all regime changes still synchronous, at the price of adding one further clutch. Although there are now two gear trains (43, 45 and 44, 46) where there was only one (35) before, there is no net increase in the total number of final gear trains because train 37 and its associated clutch 30 have gone. If ratios of −0.6 and 2.5 are chosen for trains 43, 45 and 45,46 respectively, the following succession of regimes is now possible:

| Regime | Clutch(es) Engaged | Range of Speeds of final drive shaft 38 |
| --- | --- | --- |
| high reverse | 49, 47 | −3000 to −1200 |
| middle reverse | 50, 47 | −1200 to −480 |
| low | 28 | −480 to 800 |
| middle forward | 29 | 800 to 2000 |
| high forward | 50, 48 | 2000 to 5000 |
| "super-high forward" | 49, 48 | 5000 to 12500 |

With suitable choice of ratios, yet further regimes, engageable and disengageable by synchronous changes, can be achieved by mounting further gear pairs (as indicated schematically in broken lines at 55, 56) between flanges 23 and 17, and providing extra clutch means (not shown) to engage the second gear 56 of such a pair with the final driveshaft 3B. Two further regimes can now be achieved, in each of which the gear 56 is connected to the final drive shaft 38 by the extra clutch means just mentioned, but clutches 47, 48 will both be disengaged. In the first of these two further regimes clutch 49 will be engaged, so connecting shaft 38 to the sun output 14 of unit 3 and also to the variator output 22 by way of gear train 24. In the second such further regime drive shaft 38 is connected by clutch 50 and flange 17 to the carrier output 13 of unit 3, and by way of gear set 18 to the input 19 of the variator.

Three further general points concerning the illustrated embodiments of the invention should be noted. Firstly that the use of the power-splitting feature restricts the value of the maximum power ever transmitted through the variator, so also restricting the necessary size and weight of that unit. Secondly, the significant final gear trains (35, 36 in FIG. 1; 35a, 37a in FIG. 4; 36; 43–45, 44–46 and 55–56 in FIG. 7) each transmit drive in two regimes, being connected in one of those regimes to one of the epicyclic outputs and one end of the variator, and in the other of those regimes to a different epicyclic output and to the other end of the variator. Thirdly it should be noted that while the invention has been described with reference to examples in which it is at one extreme end of the variator ratio range (−0.4 for FIG. 1, −2.5 for FIG. 4) at which all components of the gearing units (3, 3a) rotate at the same speed, the invention also includes CVT's in which the speeds and ratios are so chosen that this equality of speed occurs at a particular variator ratio intermediate the two extreme values.

We claim:

1. A continuously-variable-ratio transmission (CVT) comprising a ratio-varying unit (20), and an epicyclic unit (3) having an input (2) and three concentrically-arranged outputs (13, 14, 15) and comprising first (4) and second (5) epicyclic gears so arranged that two of the components (7,8) of the first epicyclic gear are each commoned with a component (11, 12) of the second epicyclic gear to constitute two of the outputs (13, 14) of the epicyclic unit, these two outputs being connected respectively in a fixed ratio to opposite ends (19, 22) of the ratio-varying unit, in which said two outputs of the epicyclic unit are connectable to an output shaft (38) by way of a plurality of ratio combinations, in which a plurality of clutches (26–30) are provided to engage the outputs and ratio combinations in different ways whereby the continuously-variable-ratio transmission can operate in a plurality of regimes, one of said regimes including a geared neutral condition, in which the epicyclic and ratio-varying unit ratios are chosen so that the changes between those regimes are all synchronous and that at a first given ratio-varying unit ratio all epicyclic components rotate at the same speed, whereby alternate regime changes occur at that first given ratio-varying unit ratio, and in which the second (5) of the two epicyclic gears is arranged so that the second epicyclic gear recirculates power only in the regime including the geared neutral condition, and runs idle in all other regimes.

2. A continuously-variable-ratio transmission according to claim 1 in which the clutch engagements and disengagements associated with regime changes at the first given ratio-varying unit ratio involve the engagement of different output members of the epicyclic unit, but no change to a downstream ratio combination by which drive is transmitted to the continuously-variable-ratio transmission output.

3. A continuously-variable-ratio transmission according to claim 2 in which the clutch operation involved in the remaining regime changes occur at a second given ratio-varying unit ratio at which the epicyclic components are moving at unequal speeds, and these regime changes are accompanied by changes in the downstream ratio combinations.

4. A continuously-variable-ratio transmission according to claim 1 in which the input to the epicyclic unit (3) is by way of the component (6) of the first (4) epicyclic gear that is not commoned with a component of the second (5) epicyclic gear.

5. A continuously-variable-ratio transmission according to claim 1 in which the plurality of clutches are arranged in axial sequence, concentric with the epicyclic unit outputs.

6. A continuously-variable-ratio transmission according to claim 5 in which pairs of clutches associated with one of the alternate regime changes, occurring at the first given ratio-varying unit ratio, are located adjacent each other in the axial sequence.

7. A continuously-variable-ratio transmission according to claim 5 in which a common downstream ratio combination, which transmits drive from the respective adjacent clutches to the continuously-variable-ratio transmission output in the two regimes between which that change takes place, is connectable to both of the clutches and located axially between the clutches.

8. A continuously-variable-ratio transmission according to claim 1 in which downstream ratio combinations are in the form of gear trains.

* * * * *